(12) United States Patent
Lee et al.

(10) Patent No.: US 12,252,005 B2
(45) Date of Patent: Mar. 18, 2025

(54) PLASTIC FILLER NECK FOR VEHICLES

(71) Applicants: Hyundai Motor Company, Seoul (KR); Kia Corporation, Seoul (KR)

(72) Inventors: Jin Ug Lee, Gyeonggi-do (KR); Man Seok Oh, Yongin-si (KR); Jung Su Park, Seoul (KR); Chang Han Kim, Gwangju (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 497 days.

(21) Appl. No.: 17/692,914

(22) Filed: Mar. 11, 2022

(65) Prior Publication Data
US 2022/0194217 A1 Jun. 23, 2022

Related U.S. Application Data

(62) Division of application No. 16/942,387, filed on Jul. 29, 2020, now Pat. No. 11,299,037.

(30) Foreign Application Priority Data

Nov. 12, 2019 (KR) .................. 10-2019-0143963

(51) Int. Cl.
*B60K 15/04* (2006.01)
*B29C 65/00* (2006.01)
(Continued)

(52) U.S. Cl.
CPC .............. *B60K 15/04* (2013.01); *B29C 66/71* (2013.01); *B60K 15/035* (2013.01);
(Continued)

(58) Field of Classification Search
CPC .. B60K 15/04; B60K 15/035; B60K 15/0406; B60K 15/01; B60K 15/03177; B60K 15/0409; B60K 2015/03538; B60K 2015/03453; B60K 2015/0346; B60K 2015/03493; B60K 2015/03542; B60K 2015/0458; B60K 2015/047;
(Continued)

(56) References Cited

U.S. PATENT DOCUMENTS 3,045,857 A   7/1962   Lineweber
4,185,844 A   1/1980   Hubbard et al.
(Continued)

FOREIGN PATENT DOCUMENTS

JP    2009068009 A    4/2009
JP    6203591 B2      9/2017
(Continued)

*Primary Examiner* — John L Goff, II
(74) *Attorney, Agent, or Firm* — SLATER MATSIL, LLP

(57) ABSTRACT

A method can be used to form a plastic filler neck for a vehicle. The method includes providing a fuel injection pipe comprising a polyamide material containing nanoclay and having a single layer structure in cross-section, inserting and fastening a retainer into an internal space of a tip of the fuel injection pipe to support a refueling gun, directly fastening a cap holder to the tip of the fuel injection pipe, and mounting an air drain casing to an outer diameter portion of the cap holder fastened to the fuel injection pipe using a mounting bracket.

19 Claims, 8 Drawing Sheets

(51) Int. Cl.
*B60K 15/035* (2006.01)
*B29K 77/00* (2006.01)

(52) U.S. Cl.
CPC .............. *B29K 2077/00* (2013.01); *B60K 2015/03538* (2013.01); *B60K 15/0406* (2013.01)

(58) Field of Classification Search
CPC .... B60K 2015/0477; B60K 2015/0445; B60K 2077/00; B29C 66/71; B29C 66/5221; B29K 2077/00
USPC ........................................................ 156/293
See application file for complete search history.

(56) References Cited

U.S. PATENT DOCUMENTS

| | | | |
|---|---|---|---|
| 4,954,299 A | 9/1990 | Greig et al. | |
| 4,963,421 A | 10/1990 | Dickinson et al. | |
| 5,111,858 A | 5/1992 | Aittama et al. | |
| 5,507,324 A | 4/1996 | Whitley et al. | |
| 5,634,672 A | 6/1997 | Stack et al. | |
| 5,752,553 A | 5/1998 | Kmiecik et al. | |
| 6,056,332 A | 5/2000 | Foster | |
| 6,508,275 B1 | 1/2003 | Sadr et al. | |
| 6,880,593 B1 | 4/2005 | Swane | |
| 8,349,122 B2 | 1/2013 | Castaneda et al. | |
| 2007/0012374 A1 | 1/2007 | Yasuda et al. | |
| 2015/0152816 A1* | 6/2015 | Fujiwara | B60K 15/03504 137/587 |
| 2015/0352948 A1 | 12/2015 | Kito et al. | |
| 2017/0001516 A1 | 1/2017 | Beck | |
| 2017/0158049 A1 | 6/2017 | Walkowski et al. | |
| 2017/0166745 A1 | 6/2017 | Youn et al. | |
| 2020/0406180 A1 | 12/2020 | Kondo | |

FOREIGN PATENT DOCUMENTS

| | | |
|---|---|---|
| JP | 6389228 B2 | 9/2018 |
| KR | 20010049573 A | 6/2001 |
| KR | 100408968 B1 | 12/2003 |
| KR | 20090026408 A | 3/2009 |
| KR | 20170029036 A | 3/2017 |
| KR | 20200061208 A | 6/2020 |

* cited by examiner

FIG. 3]
[PRIOR ART]
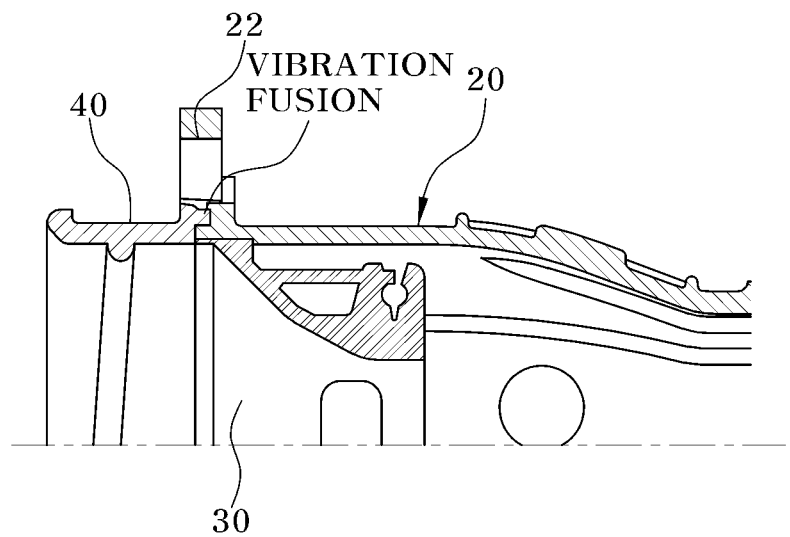
FIG. 4]
[PRIOR ART]
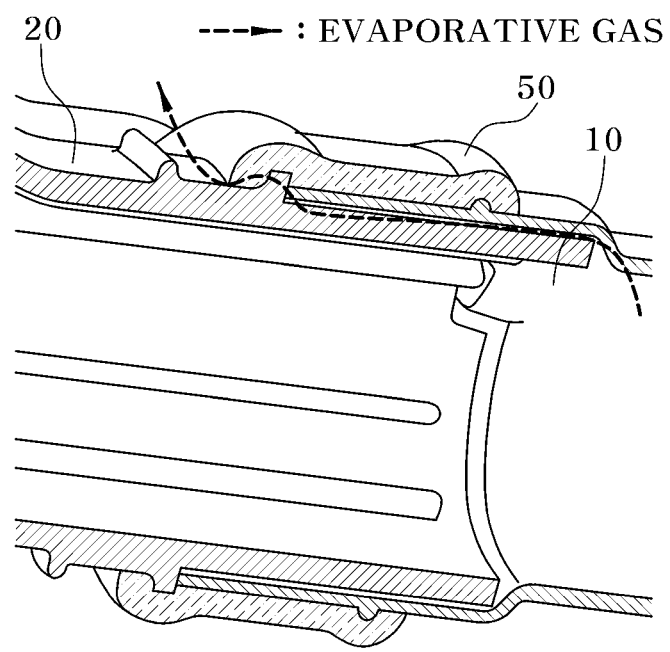

【FIG. 5】
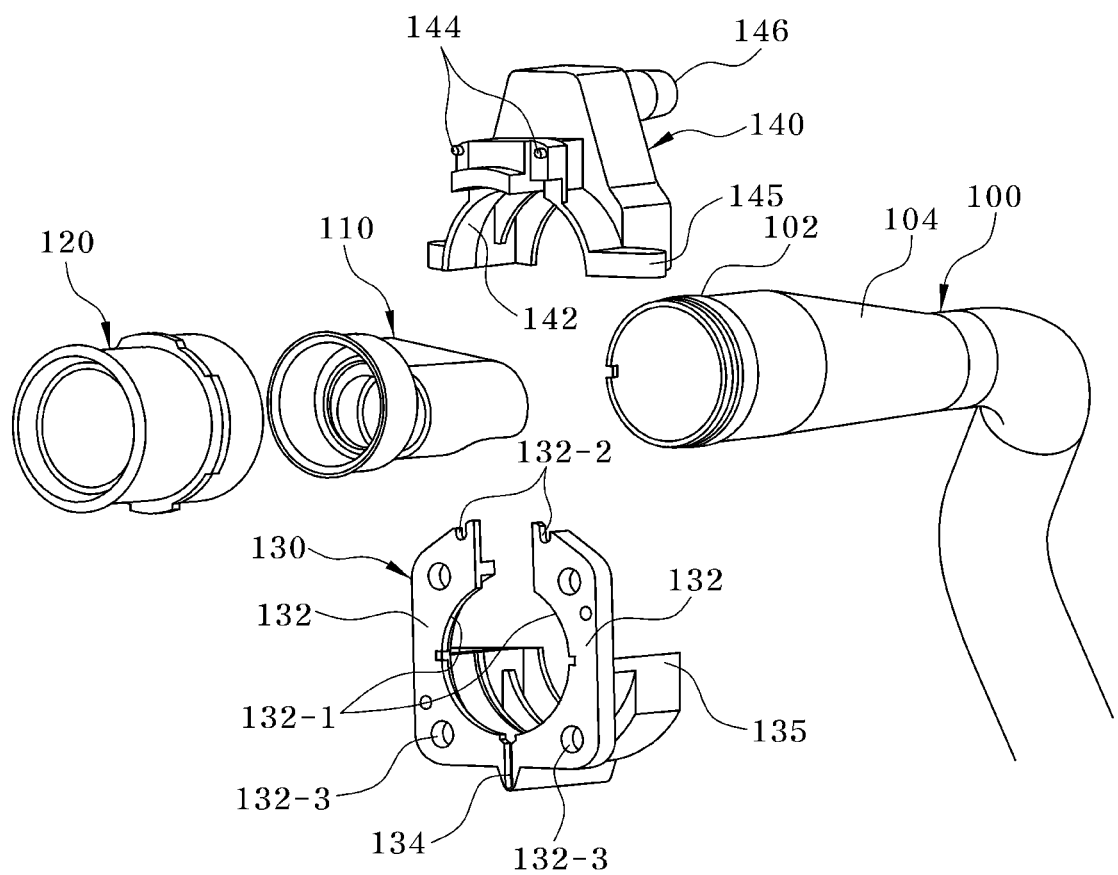

[FIG. 6]
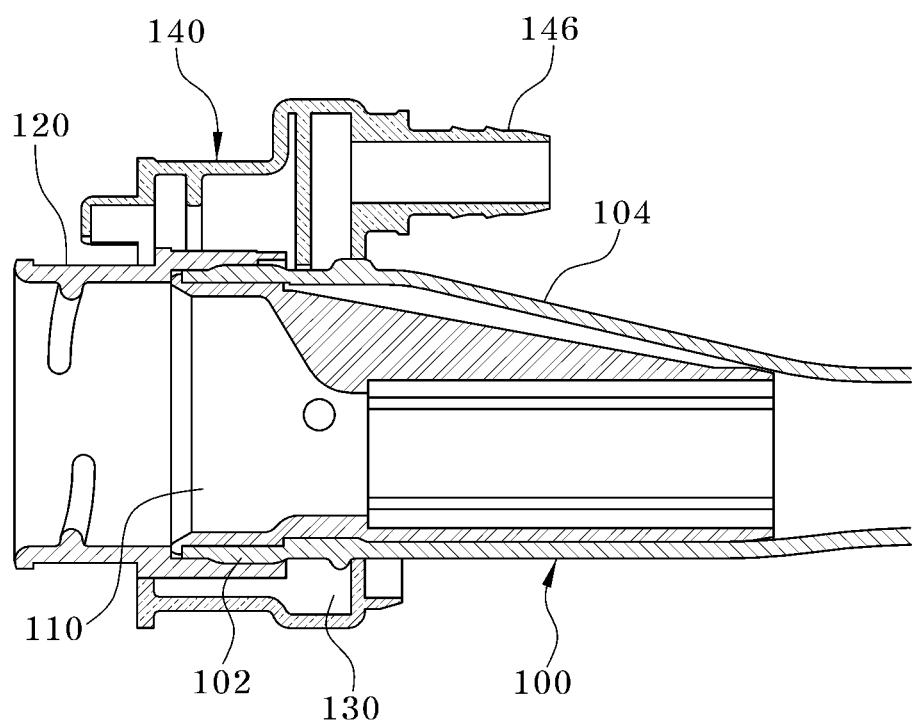

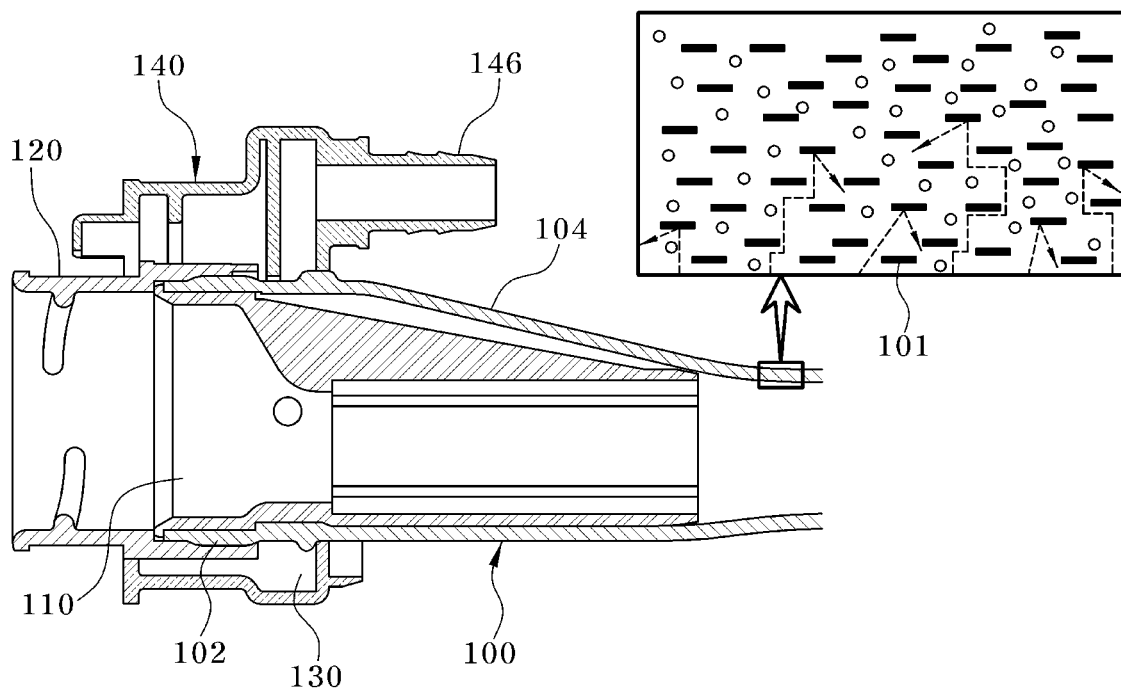
[FIG. 7]

[FIG. 8]
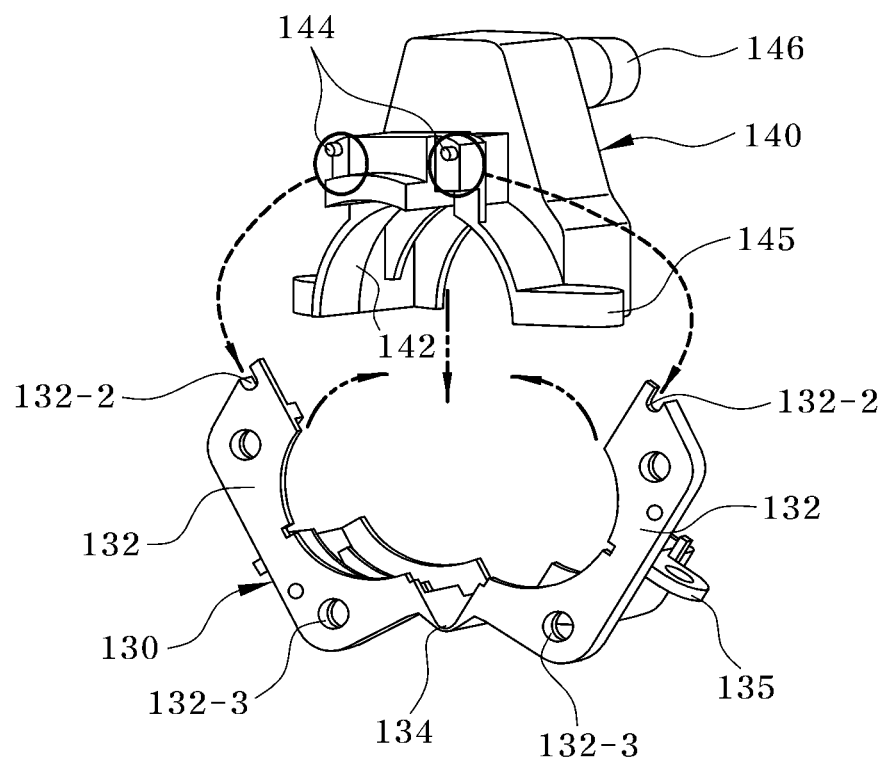

【FIG. 9】
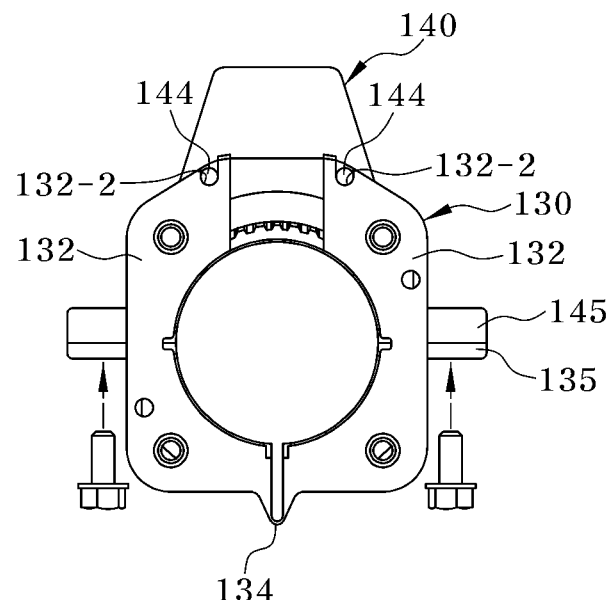
【FIG. 10】
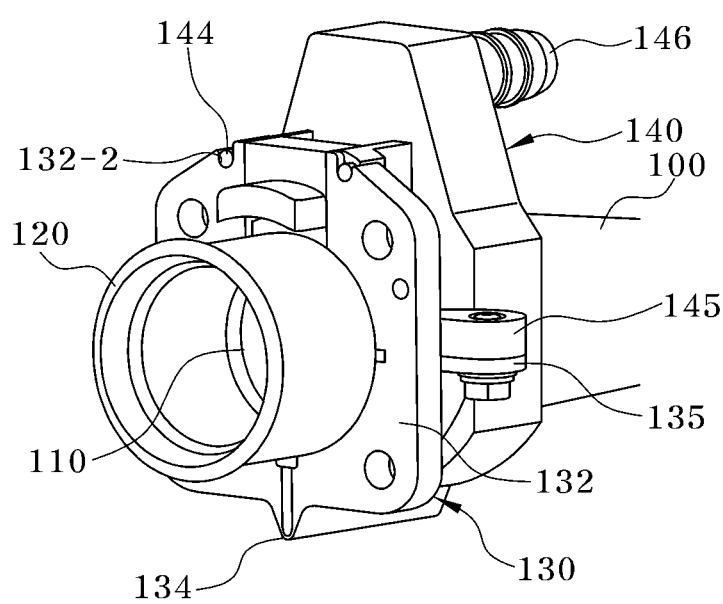

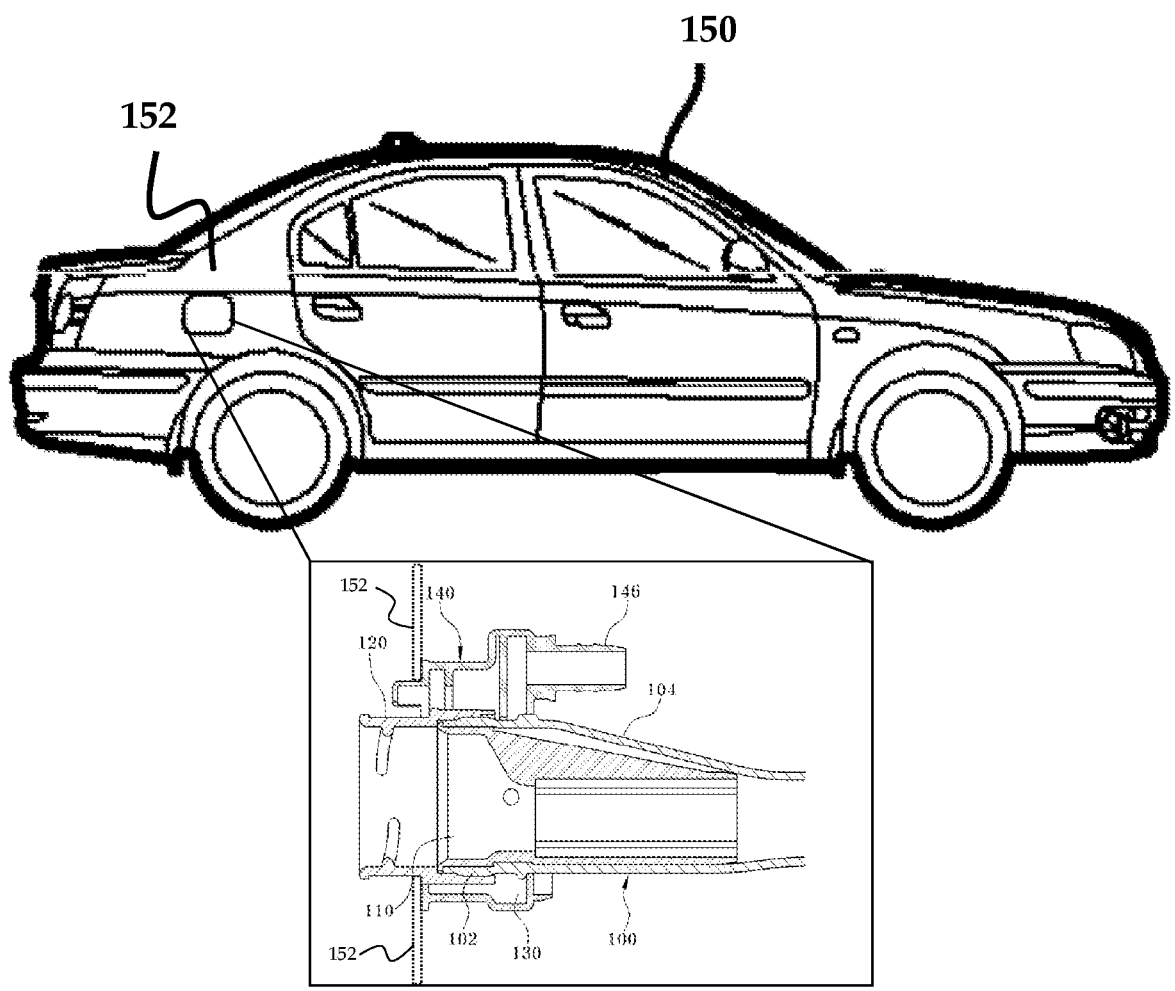
[FIG. 11]

PLASTIC FILLER NECK FOR VEHICLES

CROSS-REFERENCE TO RELATED APPLICATIONS

This application is a divisional application of U.S. patent application Ser. No. 16/942,387, filed on Jul. 29, 2020, now U.S. Pat. No. 11,299,037, which claims priority to Korean Patent Application No. 10-2019-0143963, filed on Nov. 12, 2019, which applications are hereby incorporated herein by reference.

TECHNICAL FIELD

The present disclosure relates to a plastic filler neck for vehicles.

BACKGROUND

In general, the gas evaporated from the fuel in a fuel tank is collected in a canister mounted on the upper portion of the fuel tank, and then purged to an engine intake system to be supplied to a combustion chamber of an engine for combustion. However, the evaporative gas may flow to a fuel inlet along a fuel injection pipe connected to the fuel tank.

Thus, a plastic filler neck having an evaporative gas blocking structure is mounted at the tip of the fuel injection pipe interconnecting the fuel inlet and the fuel tank.

In this case, an air drain casing communicating with outside air is connected to the canister via a connection hose such that the evaporative gas collected in the canister may be smoothly purged to the engine intake system by engine negative pressure.

For reference, the air drain casing is mainly mounted to, but is not limited to, the outer diameter portion of the plastic filler neck in order to simultaneously satisfy both conditions that the air drain casing is not visible from the outside in external appearance and prevents penetration of moisture, foreign substances, and the like coming out from the road surface.

Hereinafter, an assembly structure of a conventional plastic filler neck will be described.

FIGS. 1 and 2 are views illustrating a configuration of a conventional filler neck, in which reference numeral 10 designates a fuel injection pipe.

The fuel injection pipe 10 is made of a plastic material to have a single layer structure in cross-section.

Of course, the fuel injection pipe may be made of a plastic material to have a multilayer structure in cross-section, but it causes a significant increase in cost and weight since processes and equipment are required to form the multilayer.

Alternatively, the fuel injection pipe may be made of a steel material, but it causes an increase in weight and cost.

Accordingly, the fuel injection pipe 10 is made of a plastic material to have a multilayer structure in cross-section and an excellent evaporative gas blocking structure.

FIG. 1 illustrates a configuration in which a refueling gun inserted from a fuel inlet is mounted on the tip of the fuel injection pipe 10, wherein a filler tube 20, a retainer 30, a cap holder 40, and the like are sequentially assembled, and an air drain casing 6o is mounted on the outer diameter of the fastening portion between the filler tube 20 and the fuel injection pipe 10.

In this case, a mounting bracket 22 for mounting a vehicle body is further integrally formed on the outer diameter of the tip of the filler tube 20.

Referring to FIG. 3, the rear end portion of the cap holder 40 and the front end portion of the filler tube 20 are integrally fused to each other by vibration fusion in the state in which they pressed against each other.

Referring to FIG. 4, the rear end of the filler tube 20 is press-fitted to the inner diameter portion of the fuel injection pipe 10, and an overmolded body 50 is further mounted over the outer diameter portions of the filler tube 20 and the fuel injection pipe 10 to block a leakage of evaporative gas to the outside.

Thus, the overmolded body 50 may press the fastening portion between the filler tube 20 and the fuel injection pipe 10, to minimize a gap between the filler tube 20 and the fuel injection pipe 10 to block a leakage of evaporative gas to the outside.

However, the above-mentioned conventional filler neck has the following problems.

First, there is a small gap between the filler tube 20 and the fuel injection pipe 10 even if the overmolded body 50 is mounted on the outer diameter of the fastening portion between the filler tube 20 and the fuel injection pipe 10 as described above. Hence, evaporative gas may leak to the outside in the direction indicated by the arrow of FIG. 4.

Furthermore, if the overmolded body 50 is damaged by an impact in the event of collision, the gap between the filler tube 20 and the fuel injection pipe 10 is increased, which may lead to a leakage of fuel as well as a leakage of evaporative gas to the outside.

Second, the mounting bracket 22 formed on the outer diameter of the tip of the filler tube 20 is easily displaced by an impact in the event of collision, which may lead to a leakage of fuel as well as a leakage of evaporative gas to the outside.

The above information disclosed in this Background section is only for enhancement of understanding of the background of the disclosure and therefore it may contain information that does not form the prior art that is already known to a person of ordinary skill in the art.

SUMMARY

The present disclosure relates to a plastic filler neck for vehicles. Particular embodiments relate to a plastic filler neck for vehicles, capable of preventing a leakage of evaporative gas while minimizing an occurrence of displacement in the event of collision.

Embodiments of the present disclosure can solve problems associated with prior art.

An embodiment of the present disclosure provides a plastic filler neck for vehicles, capable of easily blocking a leakage of evaporative gas while minimizing displacement in the event of collision in such a manner that a fuel injection pipe is made of a plastic material containing nanoclay having an evaporative gas blocking effect and a cap holder is directly fused to a tip of the fuel injection pipe.

There is provided a plastic filler neck for vehicles, which includes a fuel injection pipe made of a plastic material, a retainer inserted and fastened into an internal space of a tip of the fuel injection pipe to support a refueling gun, a cap holder directly fastened to the tip of the fuel injection pipe by fusion, and an air drain casing mounted, by a mounting bracket, to an outer diameter portion of the cap holder fastened to the fuel injection pipe.

Particularly, the fuel injection pipe may be made of a polyamide material containing nanoclay to have a single layer structure in cross-section.

The tip of the fuel injection pipe may include a rectilinear tube having a predetermined length to function as a filler tube for insertion and mounting of the retainer, and a diagonal tube having a diameter reduced gradually from the rectilinear tube and integrally extending therefrom.

An inner diameter surface of a rear end of the cap holder and an outer diameter surface of the tip of the fuel injection pipe may be integrally fused to each other by rotary fusion, in which heat is applied to the cap holder while the cap holder is rotated, such that the tip of the fuel injection pipe is pressed into an internal space of the rear end of the cap holder.

The mounting bracket may include a pair of tightening plates, each having a tightening groove formed on its inner side to be pressed against an outer diameter surface of the cap holder and a locking groove formed at its upper end for fastening with the air drain casing, and a folding hinge integrally connected between lower ends of the pair of tightening plates.

The tightening groove may have an arc shape so as to be pressed against an inner diameter of a rear end of the cap holder.

Each of the tightening plates may have a vehicle body mounting hole formed for mounting with a vehicle body.

The air drain casing may have a structure in which it includes a seating groove formed on its bottom to be pressed against the outer diameter surface of the cap holder, a locking protrusion formed on its front to be fastened to the locking groove, and an air inlet formed on its rear surface to communicate with outside air.

First and second bolting ends, which are pressed against and bolted to each other, may be further formed at sides of the mounting bracket and the air drain casing.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 3 is a cross-sectional view illustrating a coupling structure between a cap holder and a filler tube in the conventional filler neck;

FIG. 4 is a cross-sectional perspective view illustrating a state in which an overmolded body is further coupled to a fastening portion between the filler tube and a fuel injection pipe in the conventional filler neck;

FIG. 5 is an exploded perspective view illustrating a filler neck according to embodiments of the present disclosure;

FIG. 6 is a cross-sectional perspective view illustrating a coupling structure between a cap holder and a filler tube-integrated fuel injection pipe in the filler neck according to embodiments of the present disclosure;

FIG. 7 is a conceptual view illustrating a material and gas blocking principle of the cap holder and the filler tube-integrated fuel injection pipe in the filler neck according to embodiments of the present disclosure;

FIGS. 8, 9, and 10 are views illustrating a process in which an air drain casing is mounted on an outer diameter portion of the cap holder using a mounting bracket in the filler neck according to embodiments of the present disclosure; and FIG. 11 is a view of a vehicle body with a plastic filler neck.

Figure 1:
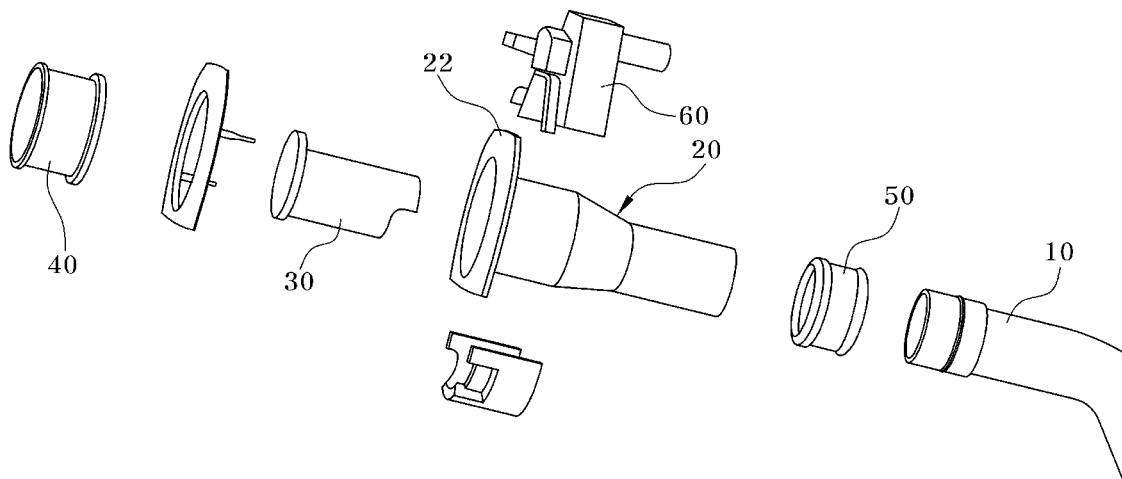
FIG. 1 is an exploded perspective view illustrating a configuration of a conventional filler neck.
Figure 2:
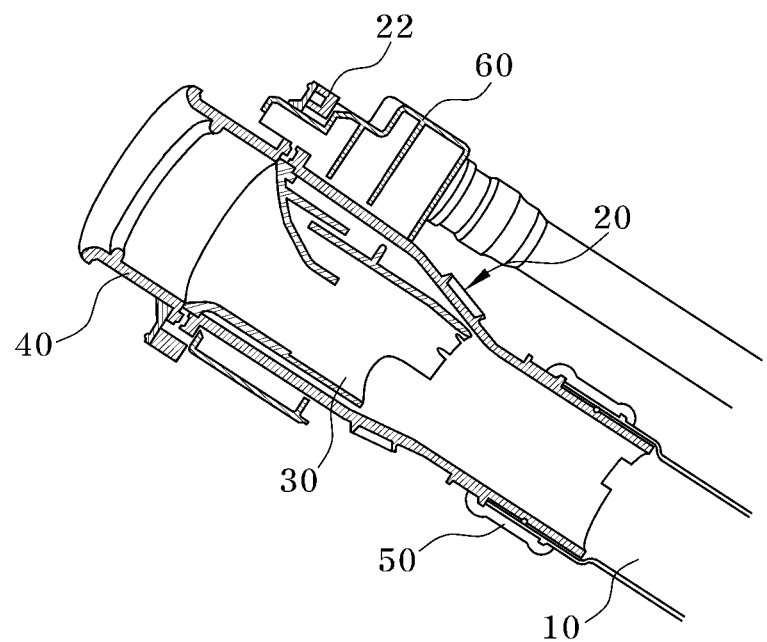
FIG. 2 is a cross-sectional perspective view illustrating an assembled state of the conventional filler neck.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent parts of the embodiments of the present disclosure throughout the several figures of the drawing.

DETAILED DESCRIPTION OF ILLUSTRATIVE EMBODIMENTS

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

FIG. 5 is an exploded perspective view illustrating a filler neck according to embodiments of the present disclosure. FIG. 6 is a cross-sectional perspective view illustrating the filler neck according to embodiments of the present disclosure. FIG. 7 is a conceptual view illustrating a gas blocking principle of the filler neck according to embodiments of the present disclosure. In each drawing, reference numeral 100 designates a fuel injection pipe.

The fuel injection pipe 100 is made of a plastic material to have a single layer structure in cross-section.

Particularly, the fuel injection pipe 100 is made of a polyamide material containing nanoclay to have a single layer structure in cross-section, thereby functioning to fundamentally block a leakage of evaporative gas.

For example, when fuel evaporative gas flows along the fuel injection pipe from a fuel tank, evaporative gas particles are blocked by a constituent nanoclay material 101 of the fuel injection pipe 100 as illustrated in FIG. 7, thereby enabling evaporative gas to be fundamentally prevented from leaking to the outside.

Of course, in addition to the fuel injection pipe 100, a cap holder 120 fused to the fuel injection pipe 100 may also be made of a polyamide material containing nanoclay.

In this case, a rigid retainer no for supporting a refueling gun is inserted and fastened into the internal space of the tip of the fuel injection pipe 100.

The retainer no has an inlet end having a large diameter for easy insertion of the refueling gun and a rear portion having a small diameter. Therefore, the retainer no has a structure in which it may be easily inserted and fastened into the internal space of the tip of the fuel injection pipe 100.

To this end, the tip of the fuel injection pipe 100 may include a rectilinear tube 102 having a predetermined length to function as a conventional filler tube for insertion and mounting of the retainer no, and a diagonal tube 104 that has a diameter reduced gradually from the rectilinear tube 102 and integrally extending therefrom.

Here, the cap holder 120 forming an inlet of a fuel inlet is directly fastened to the tip of the fuel injection pipe by rotary fusion using heat.

In more detail, by performing the rotary fusion, in which heat is applied to the cap holder 120 while the cap holder 120 is rotated, such that the tip of the fuel injection pipe 100 is pressed into the internal space of the rear end of the cap holder 120, the inner diameter surface of the rear end of the cap holder 120 and the outer diameter surface of the tip of the fuel injection pipe 100 are integrally fused to each other.

As such, it is possible to easily block a leakage of evaporative gas in such a manner that the fuel injection pipe 100 is made of a plastic material containing a nanoclay material 101 having an evaporative gas blocking effect and the cap holder 120 is directly rotated and fused to the tip of the fuel injection pipe 100.

In addition, since the cap holder 120 is directly rotated and fused to the tip of the fuel injection pipe 100, excluding the existing filler tube 20, the overmolded body 50, and the like, it is possible to prevent a leakage of fuel caused when the mounting bracket 22, the overmolded body 50, and the like integrally formed on the outer diameter of the existing filler tube 20 are easily displaced by an impact in the event of collision.

Moreover, since the tip of the fuel injection pipe 100 is shaped (of the rectilinear tube 102 and the diagonal tube 104) to function as the existing filler tube for insertion and mounting of the retainer no and the cap holder 120 is directly rotated and fused to the tip of the fuel injection pipe 100, it is possible to reduce the number of parts and reduce costs by excluding the existing filler tube 20, the overmolded body 50, and the like.

FIG. 11 illustrates a vehicle 150 the relative position of the vehicle body 152 and the fuel tank. Here, a mounting bracket 130 and an air drain casing 140 for mounting with the vehicle body 152 are mounted on the outer diameter portion of the cap holder 120 fastened to the fuel injection pipe 100 by rotary fusion.

The mounting bracket 130 is structured to support the fastening portion between the fuel injection pipe 100 and the cap holder 120 by the vehicle body 152.

To this end, as illustrated in FIG. 8, the mounting bracket 130 includes a pair of tightening plates 132 pressed against the outer diameter surface of the cap holder 120 and a folding hinge 134 integrally connected between the lower ends of the pair of tightening plates 132.

In this case, each of the tightening plates 132 has a tightening groove 132-1 formed on the inner side thereof to be pressed against the outer diameter surface of the cap holder 120, a locking groove 132-2 formed at the upper end thereof for fastening with the air drain casing 14o, and vehicle body mounting holes 132-3 formed at predetermined upper and lower positions thereof for mounting with the vehicle body 152.

Preferably, the tightening groove 132-1 of the tightening plate 132 has a concave arc shape so as to be easily pressed against the inner diameter surface of the rear end of the cap holder 120.

As illustrated in FIG. 8, the air drain casing 140 has a structure in which it includes an arc seating groove 142 formed on the bottom thereof to be pressed against the outer diameter surface of the upper portion of the cap holder 120, locking protrusions 144 formed at predetermined positions of the front thereof to be fastened to the locking grooves 132-2 formed on the tightening plates 132 of the mounting bracket 130, and an air inlet 146 formed on the rear surface thereof to communicate with outside air.

For reference, the air inlet 146 is connected to a canister via a connection hose, thereby enabling the evaporative gas collected in the canister to be smoothly purged to an engine intake system by engine negative pressure.

Accordingly, after the seating groove 142 of the air drain casing 140 is pressed against the outer diameter surface of the upper portion of the cap holder 120 at the rear end thereof and the tightening grooves 132-1 formed on the tightening plates 132 of the mounting bracket 130 are pressed against the outer diameter surface of the lower portion of the cap holder 120 at the rear end thereof, the air drain casing 140 and the mounting bracket 130 may be coupled to each other.

In more detail, the assembly of the air drain casing 140 and the mounting bracket 130 is completed, as illustrated in FIG. 10, by pressing the seating groove 142 of the air drain casing 140 against the outer diameter surface of the upper portion of the cap holder 120 integrally fused to the tip of the fuel injection pipe 100, by rotating the tightening plates 132 of the mounting bracket 130 inward about the folding hinge 134 to press the tightening grooves 132-1 of the tightening plates 132 against the outer diameter surface of the lower portion of the cap holder 120, and by pressing and fastening the locking protrusions 144 of the air drain casing 140 into the locking grooves 132-2 of the tightening plates 132.

In this case, by pressing and bolting the vehicle body mounting holes 132-3 formed on the tightening plates 132 of the mounting bracket 130 against and to the vehicle body 152, the cap holder 120, the fuel injection pipe 100, and the like as well as the mounting bracket 130 may be supported by the vehicle body 152.

As such, it is possible to cover and protect the fused portion between the cap holder 120 and the fuel injection pipe 100 while the mounting bracket 130 and the air drain casing 140 are fastened to each other.

As illustrated in FIG. 9, first and second bolting ends 135 and 145, which are pressed against and bolted to each other, are further integrally formed at the sides of the mounting bracket 130 and the air drain casing 140.

Accordingly, it is possible to further increase the coupling force between the mounting bracket 130 and the air drain casing 140 by pressing and bolting the first and second bolting ends 135 and 145 against and to each other, and to remove the gap that may be present between the cap holder and the fuel injection pipe by further tightening the outer diameter portion of the cap holder 120 integrally fused to the fuel injection pipe 100 using the mounting bracket 130 and the air drain casing 140. Thus, it is possible to more fundamentally block a leakage of evaporative gas.

The exemplary embodiments of the present disclosure provide the following effects.

First, it is possible to easily block a leakage of evaporative gas in such a manner that the fuel injection pipe is made of a plastic material containing nanoclay having an evaporative gas blocking effect and the cap holder is directly rotated and fused to the tip of the fuel injection pipe.

Second, since the cap holder is directly rotated and fused to the tip of the fuel injection pipe, it is possible to prevent a leakage of fuel caused when the mounting bracket, the overmolded body, and the like integrally formed on the outer diameter of the existing filler tube are easily displaced by an impact in the event of collision.

Third, since the tip of the fuel injection pipe is shaped to function as the existing filler tube for insertion and mounting of the retainer and the cap holder is directly rotated and fused to the tip of the fuel injection pipe, the existing filler tube, the overmolded body, and the like can be removed to reduce the number of parts.

Fourth, the mounting bracket can be easily fastened to the air drain casing by the rotatable hinge structure provided thereto, and the fused portion between the cap holder and the fuel injection pipe can be covered and protected while the mounting bracket and the air drain casing are fastened to each other.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of forming a plastic filler neck for vehicles, the method comprising:
    providing a fuel injection pipe comprising a polyamide material containing nanoclay and having a single layer structure in cross-section;
    inserting and fastening a retainer into an internal space of a tip of the fuel injection pipe to support a refueling gun;
    directly fastening a cap holder to the tip of the fuel injection pipe, wherein an inner diameter surface of a rear end of the cap holder and an outer diameter surface of the tip of the fuel injection pipe are integrally fused to each other; and
    mounting an air drain casing to an outer diameter portion of the cap holder fastened to the fuel injection pipe using a mounting bracket,
    wherein the air drain casing includes:
        a seating groove formed on its bottom to be pressed against an outer diameter surface of the cap holder;
        a locking protrusion formed on its front; and
        an air inlet formed on its rear surface and configured to communicate with outside air, and
    wherein the mounting bracket comprises a pair of tightening plates, each tightening plate having a tightening groove formed on its inner side to be pressed against the outer diameter surface of the cap holder and a locking groove formed at its upper end for fastening with the locking protrusion of the air drain casing.

2. The method of claim 1, wherein the cap holder and the fuel injection pipe are integrally fused by applying heat to the cap holder while rotating the cap holder, such that the tip of the fuel injection pipe is pressed into an internal space of the rear end of the cap holder.

3. The method of claim 1, wherein the tip of the fuel injection pipe comprises a rectilinear tube having a predetermined length to function as a filler tube for insertion and fastening of the retainer, the tip further comprising a diagonal tube having a diameter reduced gradually from the rectilinear tube and integrally extending therefrom.

4. The method of claim 1, wherein the mounting bracket further comprises a folding hinge integrally connected between lower ends of the pair of tightening plates.

5. The method of claim 1, wherein the tightening groove has an arc shape so as to be pressed against an outer diameter of the rear end of the cap holder.

6. The method of claim 1, wherein each of the tightening plates has a vehicle body mounting hole formed for mounting with a vehicle body.

7. The method of claim 1, further comprising first and second bolting ends formed at sides of the mounting bracket and the air drain casing, the first and second bolting ends being pressed against and bolted to each other.

8. A method of forming a plastic filler neck for vehicles, the method comprising:
    inserting and fastening a retainer into an internal space of a tip of a fuel injection pipe to support a refueling gun;
    directly fastening a cap holder to the tip of the fuel injection pipe; and
    mounting an air drain casing to an outer diameter portion of the cap holder fastened to the fuel injection pipe,
    wherein:
        the air drain casing includes:
            a seating groove formed on its bottom to be pressed against an outer diameter surface of the cap holder;
            a locking protrusion formed on its front; and
            an air inlet formed on its rear surface and configured to communicate with outside air, and
        wherein the air drain casing is mounted using a mounting bracket that comprises a pair of tightening plates, each tightening plate having a tightening groove formed on its inner side to be pressed against the outer diameter surface of the cap holder and a locking groove formed at its upper end for fastening with the locking protrusion of the air drain casing.

9. The method of claim 8, wherein the fuel injection pipe comprises a polyamide material containing nanoclay.

10. The method of claim 9, wherein the fuel injection pipe has a single layer structure in cross-section.

11. The method of claim 8, wherein the fuel injection pipe has a single layer structure in cross-section.

12. The method of claim 8, wherein directly fastening the cap holder to the tip of the fuel injection pipe comprises directly fastening the cap holder to the tip of the fuel injection pipe by fusion.

13. The method of claim 12, wherein directly fastening the cap holder to the tip of the fuel injection pipe comprises integrally fusing an inner diameter surface of a rear end of the cap holder and an outer diameter surface of the tip of the fuel injection pipe to each other by rotary fusion in which heat is applied to the cap holder while the cap holder is rotated, such that the tip of the fuel injection pipe is pressed into an internal space of the rear end of the cap holder.

14. The method of claim 8, wherein the tip of the fuel injection pipe comprises a rectilinear tube having a predetermined length to function as a filler tube for insertion and fastening of the retainer, the tip further comprising a diagonal tube having a diameter reduced gradually from the rectilinear tube and integrally extending therefrom.

15. The method of claim 8, wherein the mounting bracket further comprises a folding hinge integrally connected between lower ends of the pair of tightening plates.

16. The method of claim 8, wherein the tightening groove has an arc shape so as to be pressed against an outer diameter of a rear end of the cap holder.

17. The method of claim 8, wherein each of the tightening plates has a vehicle body mounting hole formed for mounting with a vehicle body.

18. The method of claim 8, further comprising first and second bolting ends formed at sides of the mounting bracket and the air drain casing, the first and second bolting ends being pressed against and bolted to each other.

19. A method of forming a plastic filler neck for vehicles, the method comprising:
- providing a fuel injection pipe comprising a polyamide material containing nanoclay and having a single layer structure in cross-section;
- inserting and fastening a retainer into an internal space of a tip of the fuel injection pipe to support a refueling gun, wherein the tip of the fuel injection pipe comprises a rectilinear tube having a predetermined length to function as a filler tube for insertion and fastening of the retainer;
- directly fastening an inner diameter surface of a rear end of a cap holder to an outer diameter surface of the tip of the fuel injection pipe by applying heat to the cap holder while rotating the cap holder so that the tip of the fuel injection pipe is pressed into an internal space of the rear end of the cap holder; and
- mounting an air drain casing to an outer diameter portion of the cap holder fastened to the fuel injection pipe using a mounting bracket, wherein the air drain casing includes a seating groove formed on its bottom to be pressed against an outer diameter surface of the cap holder, a locking protrusion formed on its front, and an air inlet formed on its rear surface and configured to communicate with outside air and wherein the mounting bracket comprises a pair of tightening plates, each tightening plate having a tightening groove formed on its inner side to be pressed against the outer diameter surface of the cap holder and a locking groove formed at its upper end for fastening with the locking protrusion of the air drain casing.

\* \* \* \* \*

UNITED STATES PATENT AND TRADEMARK OFFICE
CERTIFICATE OF CORRECTION

PATENT NO. : 12,252,005 B2
APPLICATION NO. : 17/692914
DATED : March 18, 2025
INVENTOR(S) : Lee et al.

Page 1 of 1

It is certified that error appears in the above-identified patent and that said Letters Patent is hereby corrected as shown below:

In the Claims

In Column 8, in Claim 5, Line 9, after "shape" delete "so as".

In Column 9, in Claim 16, Line 2, after "shape" delete "so as".

Signed and Sealed this
Twenty-second Day of April, 2025

Coke Morgan Stewart
*Acting Director of the United States Patent and Trademark Office*